July 18, 1972    J. N. HARMAN III, ETAL    3,677,708
NO₂ ANALYSIS AND SCRUBBER THEREFOR
Filed Dec. 15, 1969
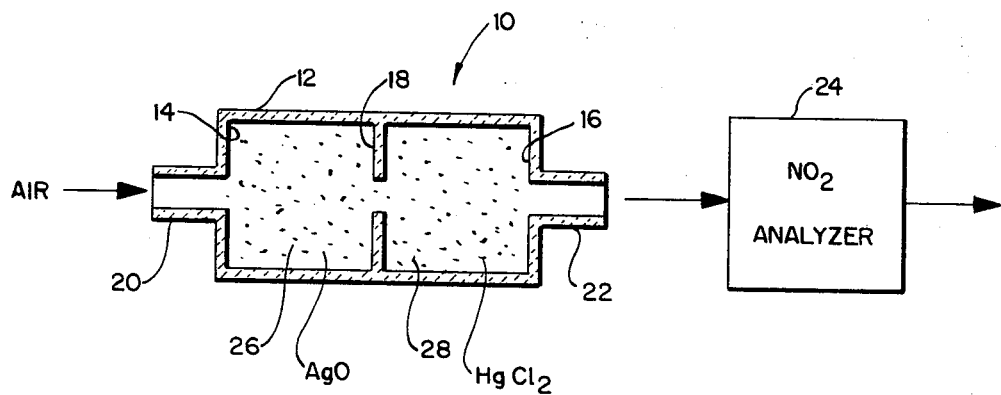
INVENTORS
J. N. HARMAN III
R. M. NETI
BY Thomas L. Peterson
ATTORNEY

United States Patent Office

3,677,708
Patented July 18, 1972

3,677,708
$NO_2$ ANALYSIS AND SCRUBBER THEREFOR
John N. Harman III, Placentia, and Radhakrishna M. Neti, Brea, Calif., assignors to Beckman Instruments, Inc.
Filed Dec. 15, 1969, Ser. No. 885,006
Int. Cl. B01j 11/06; G01n 31/06, 31/10
U.S. Cl. 23—232 R                                                7 Claims

ABSTRACT OF THE DISCLOSURE

Method and apparatus for determining $NO_2$ in a sample gas stream containing interferents utilizing a scrubber and an analytical instrument which is sensitive both to $NO_2$ and the interferents. The scrubber contains argentic oxide (AgO) which effectively removes both positive and negative interferents from the sample gas stream, but does not affect the $NO_2$ content of the stream. The invention is particularly applicable to the monitoring of the $NO_2$ content of polluted air.

CROSS-REFERENCES TO RELATED APPLICATIONS

This application is related to copending application of John J. McGee et al. entitled "Scrubber Apparatus," Ser. No. 649,675, filed June 28, 1967, now U.S. Pat. 3,495,944, which issued Feb. 17, 1970, and to our copending patent application entitled "Nitric Oxide Analysis," Ser. No. 885,007, filed concurrently herewith, both of which applications are assigned to the assignee of the present application.

BACKGROUND OF THE IINVENTION

This invention relates to gas analysis and, more particularly, to a method and apparatus for determining the $NO_2$ content of a sample gas stream and also to a scrubber for use in the method and apparatus which is capable of selectively removing interferents from the sample gas stream without affecting the $NO_2$ content thereof.

Nitrogen dioxide is a common irritating component found in polluted air. In order that dangerous levels of this constituent may be known and corrective measures may be taken, means is required for practically and inexpensively determining the level of $NO_2$ in air. While the description of the present invention is directed primarily to the determination of $NO_2$ in air, it is to be understood that the invention is also applicable to the determination of $NO_2$ in other gaseous media containing $NO_2$ and any of the interferents commonly found in air.

There are a variety of analytical instruments available on the market today for determining the content of certain irritating gaseous species in polluted air. One of such instruments is described in U.S. Pat. No. 3,314,864 to Hersch. This instrument comprises an electrochemical cell which contains a body of halide electrolyte in which there is immersed a cathode of inert conductive material, such as platinum or graphite, and an anode of either active carbon, calomel or silver chloride. If an air stream containing an oxidant, such as $NO_2$, is conveyed into the electrolyte in the cell, the $NO_2$ will oxidize the halide ions in the electrolyte to form a halogen. The halogen-bearing electrolyte is passed over the cathode where the halogen is reduced to halide ions. A galvanic current is generated by the electrode pair which is a function of the rate of entry of the $NO_2$ into the cell electrolyte and, thus, a measure of the level of $NO_2$ in the air being analyzed.

Since it is the reduction of iodine which establishes the measuring signal in the Hersch cell, any oxidation of the iodide in the electrolyte which is not caused by $NO_2$ will give rise to a signal in excess of that indicating the $NO_2$ quantity. Any constituent in the sample gas that oxidizes the iodide electrolyte is a positive interferent. Similarly, the presence of an interferent which may chemically react with iodine and cause reduction thereof will also give rise to a misleading signal nad is termed a negative interferent. Examples of positive interferents which may be found in gas mixtures also containing $NO_2$ are ozone and halogen gases such as chlorine or bromine, while examples of negative interferents are sulfur dioxide, hydrogen sulfide, mercaptans and other organic sulfur compounds such as organic sulfides or disulfides.

For the aforementioned Hersch cell to effectively monitor the $NO_2$ content of a sample gas stream containing any one or more of the above-mentioned interferents, it is necessary that a scrubber apparatus be employed to remove the interferents or reduce the interferents to a level so as not to appreciably affect the analysis of $NO_2$ in the gas stream. Therefore, what is needed is a scrubber material which will remove the above-mentioned interferents from an $NO_2$ bearing gas stream without affecting the $NO_2$ content of the stream. Ideally, a solid phase chemical scrubber is desired for removing the interferents from the sample gas so as to ensure that the interferents are permanently removed in contrast to absorption columns in which interferents would eventually desorb and be released to the $NO_2$ analyzer. In addition, a solid phase chemical scrubber has the advantage that the output signal and response time of the $NO_2$ analyzer are not adversely affected as in the case with liquid phase chemical scrubbers. Finally, the solid phase scrubber has the adavntage that it is most practical for minimum maintenance and ease of handling in an analytical instrument.

SUMMARY OF THE INVENTION

The principal object of the present invention is to provide an improved method and apparatus for determining $NO_2$ in a sample gas stream.

Another object of the invention is to provide a scrubber which is capable of removing interferents from a sample gas stream without affecting the $NO_2$ content of the gas stream.

According to the principal aspect of the present invention, we have found that argentic oxide (AgO) may be successfully utilized for scrubbing interferents from an $NO_2$ bearing gas stream, such as polluted air, without affecting the $NO_2$ content of the gas stream. Thus, with the use of such a scrubber, the $NO_2$ content of a gas stream containing interferents may be determined by an instrument sensitive both to $NO_2$ in the interfents, without errors resulting from the interferents contained in the gas stream.

BRIEF DESCRIPTION OF THE DRAWING

The drawing illustrates a schematic sectional view of the scrubber apparatus of the present invention employed with an $NO_2$ analyzer.

DESCRIPTION OF THE PREFERRED EMBODIMENTS

Referring now to the drawing in detail, there is shown a scrubber apparatus generally designated 10 which preferably comprises a glass or plastic container 12 divided into two separate sections 14 and 16 by means of a perforated wall 18. The container 12 has an inlet 20 adapted to receive the sample gas stream and an outlet 22 which is connected to a $NO_2$ analyzer 24.

The $NO_2$ analyzer may be a galvanic cell of the type disclosed in the aforementioned Hersch patent or may be a colorimetric instrument for determining nitrogen dioxide in accordance with the Saltzman method which is described in detail in U.S. Public Health Service Publication No. 999-AP-11. In the Saltzman method, the nitrogen dioxide in the sample gas is absorbed in a suitable absorbing reagent. A red-violet color will appear, the intensity of which is dependent upon the $NO_2$ content of the sample gas stream. This color may be compared with color standards visually or transferred to a suitable cuvette and read by an appropriate instrument such as a spectrophotometer.

The gas sample being monitored is introduced into the scrubber 10 via the inlet port 20, and will pass through the chambers 14 and 16 and will exit from the outlet 22 into the $NO_2$ analyzer 24.

The compartments 14 and 16, respectively, of the scrubber 10 are filled with scrubbing materials 26 and 28. In accordance with the principal feature of the invention, the scrubber material 26 comprises argentic oxide. The argentic oxide may be provided in the compartment 14 either in bulk granular form, mixed with a powdered dispersing agent, such as Teflon [a polyhalogenated hydrocarbon product sold by E. I. du Pont de Nemours & Co.] or other dispersant or may be coated on a suitable nonreactive and nonabsorbing substrate material such as powdered Teflon. We have found that argentic oxide efficiently scrubs the interferents commonly found in polluted air which were mentioned hereinabove. It is believed that the mechanism of the scrubbing reaction of argentic oxide with such interferents may be characterized by the following equations:

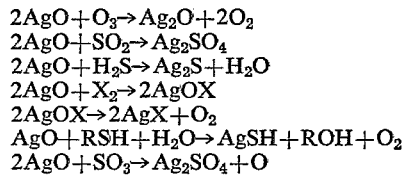

where X represents any halogen.

In addition, we have discovered quite unexpectedly that argentic oxide, unlike argentous oxide, in an appropriate quantity as hereinafter described, does not react with $NO_2$ at the levels normally encountered in air and thus does not affect the $NO_2$ content of an air sample stream passing through the scrubber. This is quite surprising inasmuch as one would normally expect that $NO_2$ would react with argentic oxide to form silver nitrate.

Some argentic oxide has been found to contain contaminants which detract from quantitative transmission and speed of transmission of $NO_2$ therethrough. We have found that these contaminants may be removed by placing the scrubber containing argentic oxide in a vacuum desiccator at a vacuum of about 20 inches of mercury and 80° C. for about 24 hours. After this treatment, the scrubber should be stored in a dry storage area prior to use.

Argentic oxide may not necessarily have the desired capacity, that is life, for scrubbing certain reductants, such as hydrogen sulfide and mercaptans, when the latter are present in a sample gas stream at relatively high levels. Therefore, it is advantageous to provide in compartment 16 a scrubber material 28 which is capable of removing these reductants, but will quantitatively pass $NO_2$. In the aforementioned McGee et al. application, it is mentioned that mercuric chloride scrubs hydrogen sulfide and mercaptans but does not affect the $SO_2$ content of a sample gas stream. We have further discovered that mercuric chloride also does not affect the $NO_2$ content of a sample gas stream. The mercuric chloride may be provided either in bulk granular form or deposited on Teflon powder in the form of a coating. Such coating may be provided by dissolving the mercuric chloride in a suitable solvent and mixing the mercuric chloride solution with Teflon powder. Thereafter the mixture is dried with the result that the Teflon powder is provided with the mercuric chloride coating.

The effect of argentic oxide on an $NO_2$ bearing gas can be appreciated by considering the following two examples:

Example No. 1

A test gas comprising $NO_2$ in dry nitrogen was conveyed from a gas bomb containing the gas to a Beckman Model 908 oxidant analyzer which is an apparatus similar to that described in the aforementioned Hersch patent. The current output of the analyzer indicated that the test gas contained 1 p.p.m. nitrogen dioxide, which is in excess of the amount normally found in polluted air. A scrubber was then filled with a mixture of 1 gram of laboratory synthesized argentic oxide granules and 3 grams Teflon powder. Teflon is inert and was employed merely to minimize the compaction of the argentic oxide granules. The argentic oxide was treated in a vacuum desiccator in the manner described hereinabove. The scrubber was inserted between the $NO_2$ gas bomb and the analyzer. Essentially no increase in response time of the analyzer or attenuation of the analyzer's output signal was observed. This test therefore established that the 1 gram of argentic oxide did not react with or delay transmission of the $NO_2$ sample gas.

Example No. 2

A test identical to that described in Example No. 1 was conducted with the exception that 2 grams of argentic oxide were employed in the scrubber. In this case, no output signal was observed from the analyzer for about fifteen minutes after the scrubber was inserted between the $NO_2$ gas bomb and the analyzer, thus indicating that the 2 grams of argentic oxide in the scrubber caused appreciable delay in the transmission of the $NO_2$. Once the $NO_2$ passed from the scrubber to the analyzer, the analyzer produced an output signal indicating 1 p.p.m. $NO_2$, thus showing that essentially no $NO_2$ in the test gas stream was permanently scrubbed by the argentic oxide.

The results of the tests described in Examples 1 and 2 indicate that for a sample gas containing about 1 p.p.m. $NO_2$ or less, the scrubber of the present invention should employ preferably no greater than about 1 gram of argentic oxide to avoid any delay in the transmission of $NO_2$ through the scrubber. To provide an instrument having a response time less than about fifteen minutes for monitoring the $NO_2$ content of polluted air, the quantity of argentic oxide employed in the scrubber should be less than 2 grams. Under those circumstances where the gas sample contains substantially greater than 1 p.p.m. $NO_2$, it would be expected that greater than 2 grams of argentic oxide would be required to provide suitable scrubbing efficiency and capacity without significantly delaying the transmission of the $NO_2$ to the $NO_2$ analyzer.

The argentic oxide scrubber of the present invention has a high scrubbing efficiency and scrubbing capacity for interferents. Scrubbing efficiency is dependent upon the ability of the scrubber to remove interfering constituents in a gas stream such as mercaptans, sulfur dioxide, hydrogen sulfide, halogens and ozone. For example, 95% scrubbing efficiency means that when a test gas containing 100 p.p.m. interferents is passed through the scrubber only 5 p.p.m. is seen at the output of the scrubber as sensed by an appropriate analyzer which is sensitive to the interferents. The capacity of the scrubber is the numercical product of parts per million of the interfering gas that is removed and time. The capacity therefore provides a measure of the length of time that a scrubber may be employed at known levels of interferents in a gas stream.

The ability of the argentic oxide scrubber of the present invention to scrub various interferents can best be appreciated by considering the following specific examples:

Example No. 3

A test gas comprising ethyl mercaptan in nitrogen was conveyed from a gas bomb containing the gas to a Beckman Model 906 $SO_2$ analyzer which utilizes coulometric electrochemical cell that is sensitive to reductants. The current output of the cell indicated that the test gas contained 8.5 p.p.m. ethyl mercaptan. A scrubber containing .8 gram argentic oxide and about 6.2 grams powdered Teflon was inserted between the gas bomb and the reductants analyzer. The output of the analyzer indicated a scrubbing efficiency of greater than 95% for six and one-half hours with respect to ethyl mercaptan and a capacity of 55 p.p.m. hours.

Example No. 4

A test like that described in Example No. 3 was conducted with the exception that the test gas was methyl mercaptan in nitrogen. The reductants analyzer indicated that the gas contained 3 p.p.m. methyl mercaptan. The scrubbing efficiency for the argentic oxide scrubber with respect to methyl mercaptan was greater than 95% for nine hours and the capacity of the scrubber was 27 p.p.m. hours.

Example No. 5

A test like that described in Example No. 3 was conducted with the exception that the test gas contained 4 p.p.m. $SO_2$ in nitrogen. The test indicated that the argentic oxide scrubber had a scrubbing efficiency for $SO_2$ of greater than 95% for two hours and a capacity of 88 p.p.m. hours.

Example No. 6

A test like that described in Example No. 3 was conducted with the exception that the sample gas contained 16 p.p.m. hydrogen sulfide in nitrogen. The test indicated that the argentic oxide scrubber had a scrubbing efficiency for hydrogen sulfide of greater than 95% for two hours and a capacity of 32 p.p.m. hours. For a second test gas containing 67 p.p.m. hydrogen sulfide in nitrogen, the scrubber had an efficiency of greater than 95% for two hours and a capacity of 134 p.p.m. hours.

Example No. 7

A test similar to those described above was conducted on a like argentic oxide scrubber except that the analyzer employed was a Beckman Model 908 oxidant analyzer and the test gas comprised 2 p.p.m. chlorine in scrubbed room air. The test showed that the argentic oxide scrubber had a scrubbing efficiency for chlorine of greater than 95% for 91.5 hours and a capacity of 183 p.p.m. hours.

Example No. 8

Two tests like that described in Example No. 7 were conducted with the exception that the test gases contained 1 and 100 p.p.m. ozone in scrubbed room air. The tests showed that the argentic oxide scrubber had a scrubbing efficiency of greater than 95% for ozone for 200 hours at 1 p.p.m. ozone and 2 hours at 100 p.p.m. ozone and a capacity of 200 p.p.m. hours for both gases.

It can be appreciated that had the mercuric chloride scrubbing material described hereinabove been incorporated in the scrubbers described in the aforementioned examples, the scrubbing efficiency and capacity for at least hydrogen sulfide and mercaptans would have been increased.

Although the invention has been described in considerable detail with particular reference to certain preferred embodiments thereof, variations and modifications can be effected within the spirit and scope of the invention as described hereinabove, and as defined in the appended claims.

What is claimed is:

1. A method of analyzing $NO_2$ in a sample gas stream containing $NO_2$ and interferents with an analyzer that is sensitive both to $NO_2$ and the interferents comprising passing the gas stream through a scrubber and conveying the gas effluent from said scrubber to said analyzer wherein the improvement comprises:

providing argentic oxide in said scrubber.

2. A method as set forth in claim 1 including the additional step of providing mercuric chloride in said scrubber.

3. A method as set forth in claim 1 wherein said sample gas stream contains $NO_2$ and interferents at a level approximating that found in polluted air, and said argentic oxide is present in a quantity sufficient to efficiently scrub said interferents but not so great as to appreciably affect the transmission of $NO_2$ therethrough.

4. An apparatus for determining the $NO_2$ ocntent of a sample gas stream containing interferents comprising:

a container having an inlet port and an outlet port;
   argentic oxide in said container;
   an analyzer that is sensitive to both $NO_2$ and said interferents; and
   means connecting the outlet port of said container to said analyzer.

5. An apparatus as set forth in claim 4 wherein said container also contains mercuric chloride.

6. An apparatus as set forth in claim 4 wherein said container contains an amount of argentic oxide sufficient to efficiently scrub interferents from polluted air but less than 2 grams.

7. A scrubber apparatus for selectively removing interferents from a gas stream containing $NO_2$, said apparatus comprising a container having an inlet port and an outlet port adapted to be connected to a $NO_2$ analyzer which is sensitive to the interferents as well as $NO_2$, wherein the improvement comprises:

a scrubber material in said container including argentic oxide; and said container also contains mercuric chloride.

References Cited

UNITED STATES PATENTS 3,399,038  8/1968  Maurice et al. _____ 23—254

FOREIGN PATENTS 166,285  7/1921  Great Britain.

OTHER REFERENCES

Merck Index, 7th edn, Merck & Co. Inc., 1964, pp. 937, 938 relied on.

Popov et al., Chem. Abstr. 31, 2589ᵇ (1937).

MORRIS O. WOLK, Primary Examiner

R. M. REESE, Assistant Examiner

U.S. Cl. X.R.

23—25, 159, 254 R; 252—463